United States Patent
Furuta

(10) Patent No.: US 9,663,598 B2
(45) Date of Patent: May 30, 2017

(54) ORGANOSILICON COMPOUND-CONTAINING THERMOSETTING COMPOSITION AND CURED PRODUCT THEREOF

(71) Applicant: TOAGOSEI CO., LTD., Minato-ku (JP)

(72) Inventor: Naomasa Furuta, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 14/916,321

(22) PCT Filed: Sep. 9, 2014

(86) PCT No.: PCT/JP2014/073758
§ 371 (c)(1),
(2) Date: Mar. 3, 2016

(87) PCT Pub. No.: WO2015/037571
PCT Pub. Date: Mar. 19, 2015

(65) Prior Publication Data
US 2016/0200842 A1    Jul. 14, 2016

(30) Foreign Application Priority Data
Sep. 13, 2013 (JP) ................................. 2013-189928

(51) Int. Cl.
*C08G 77/20* (2006.01)
*C08F 130/08* (2006.01)
*C08F 230/08* (2006.01)
*C08F 299/08* (2006.01)

(52) U.S. Cl.
CPC .......... *C08F 130/08* (2013.01); *C08F 230/08* (2013.01); *C08F 299/08* (2013.01)

(58) Field of Classification Search
CPC .................................................. C08G 77/20
See application file for complete search history.

(56) References Cited

U.S. PATENT DOCUMENTS

2010/0029841 A1    2/2010  Tauchi et al.
2014/0323677 A1*  10/2014  Kitamura ............. C08F 299/08
                                                    528/32

FOREIGN PATENT DOCUMENTS

| EP | 0 329 441 A1 | 8/1989 |
|----|--------------|--------|
| JP | 1-308418 A | 12/1989 |
| JP | 2003-55481 A | 2/2003 |
| JP | 2011-61211 A | 3/2011 |
| JP | 2011-102399 A | 5/2011 |
| WO | 2013/031798 A1 | 3/2013 |

OTHER PUBLICATIONS

International Search Report issued Dec. 2, 2014 in PCT/JP2014/073758 filed Sep. 9, 2014.

* cited by examiner

*Primary Examiner* — Robert Harlan
(74) *Attorney, Agent, or Firm* — Oblon, McClelland, Maier & Neustadt, L.L.P.

(57) ABSTRACT

The thermosetting composition of the present invention comprises 100 parts by mass of an organosilicon compound represented by a general formula (1) and 0.01 to 10 parts by mass of a polymerization initiator having a 10-hour half-life temperature in a range from 80° C. to 130° C.

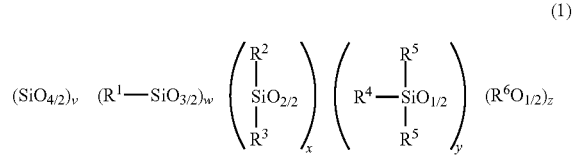

(In the formula (1), $R^1$, $R^2$, $R^3$, $R^4$ and $R^5$ are each, independently, a hydrogen atom, an alkyl group having 1 to 10 carbon atoms, an aralkyl group having 7 to 10 carbon atoms, a cycloalkyl group having 1 to 10 carbon atoms, a cycloaralkyl group having 9 to 12 carbon atoms, an aryl group having 6 to 10 carbon atoms or a group having an ethylenically unsaturated group; at least one of $R^1$, $R^2$, $R^3$, $R^4$ and $R^5$ is a group having an ethylenically unsaturated group; $R^6$ is a hydrogen atom or an alkyl group having 1 to 6 carbon atoms; v, w, x, y and z represent number of moles and are 0 or a positive number; at least one of w and x is a positive number; $0 \leq w/(v+x+y+z) \leq 10$ is satisfied.)

16 Claims, No Drawings

ORGANOSILICON COMPOUND-CONTAINING THERMOSETTING COMPOSITION AND CURED PRODUCT THEREOF

TECHNICAL FIELD

The present invention relates to a thermosetting composition and a cured product of the same. More specifically, the invention relates to a thermosetting composition that is excellent in heat resistance and is useful for formation of an adhesive portion, a sealing portion, or a protective layer for electronic components in a semiconductor device, a printed circuit board or an LED-related instrument, and to a cured product of the same.

BACKGROUND ART

Electronic equipments such as a semiconductor device and a printed circuit board have, for example, various electronic components on a substrate containing a resin, glass, a metal and the like.

The amount of heat generation from semiconductor devices is further increasing along with the recent increase in the integration and capacity of semiconductor chips, but the cabinets of electronic equipment containing semiconductor devices are reducing in size and weight. Therefore, the density in the electronic equipment is further increasing, and the thermal environments for electron circuit boards and electronic components are increasingly severe. In addition, rapid temperature variation is repeated along with the variation in load and environmental change during use of the electronic equipment. These circumstances also surround light-emitting diodes (LEDs). With the expansion of the use of LEDs, LEDs are often used in severe environments such as outdoor, so that necessity for protective films for components to be heated is increasing. But, it is difficult to sufficiently remove heat from the high heat quantity associated with the increase of brightness of LEDs, and the protective film may be exfoliated or cracked by heat shock when the temperature of the electronic components including LEDs is markedly increased or decreased by each flickering. Accordingly, a cured film having high heat resistance (heat shock resistance) for electronic circuit materials is required.

Patent Document 1 discloses a specific silane compound as a material having high heat resistance, and describes that high connection reliability is achieved by arranging a thermosetting silicone polymer, which is obtained by reaction the silane compound with a hydrosilylation agent, on the surface of a substrate such as a mother board.

In addition, the applicant discloses a heat-resistant resin composition containing a hydrosilylated polymer obtained from a silicon-containing polymer compound having a specific structure (Patent Document 2). Furthermore, the applicant suggests a method for producing a cured product having high heat shock resistance, the method including the steps of obtaining a cured product precursor having ethylenically unsaturated bonds by copolycondensation of a specific silicon-containing monomer, and curing at least a portion of the ethylenically unsaturated bonds (Patent Document 3).

[Patent Document 1] JP-A 2011-61211
[Patent Document 2] JP-A 2011-102399
[Patent Document 3] WO 2013/031798

SUMMARY OF THE INVENTION

Problems that the Invention is to Solve

The methods described in Patent Documents 1 and 2 use hydrosilylation, so that a catalyst such as platinum chloride is often required to be used for the reaction. The use of such a catalyst can cause problems such as discoloration because of the residual catalyst.

The method described in Patent Document 3 does not use hydrosilylation, and the cured product obtained by this method is not exfoliated or cracked even if exposed to repeated heat shock at high temperatures, and has high resistance against heat shock. However, as described above, for LED-related and other uses, from the viewpoint of securing reliability in the use under severe thermal conditions, the cured film is required to have high heat resistance without causing exfoliation or cracking even if exposed to heating conditions at about 100° C. to 150° C. for a long time over several hundreds to thousands hours. The cured product obtained by the method described in Patent Document 3 has high heat resistance against such conditions, but the cured product obtained by thermosetting may require some improvements in heat resistance depending on the conditions.

The present invention is intended to provide a thermosetting composition that contains an organosilicon compound and that will not cause cracking or color change even if exposed to under a heating condition for a long time, and provide a cured product excellent in heat resistance.

Means to Solve the Problems

Inventors of the present invention conducted intensive studies in view of the problems described above, and found that the addition of a polymerization initiator having a specific 10-hour half-life temperature during thermosetting of a specific organosilicon compound containing an ethylenically unsaturated group provides a cured product having high heat resistance to thus complete the invention.

The present inventions are as follows.

[1] A thermosetting composition comprising 100 parts by mass of an organosilicon compound represented by a general formula (1) and 0.01 to 10 parts by mass of a polymerization initiator having a 10-hour half-life temperature in a range from 80° C. to 130° C.

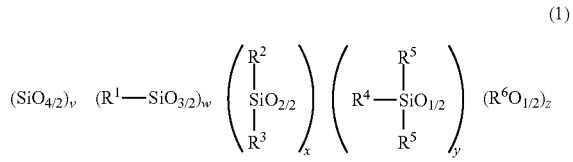

(In the formula (1), $R^1$, $R^2$, $R^3$, $R^4$ and $R^5$ are each, independently, a hydrogen atom, or a group having an alkyl group having 1 to 10 carbon atoms, an aralkyl group having 7 to 10 carbon atoms, a cycloalkyl group having 1 to 10 carbon atoms, a cycloaralkyl group having 9 to 12 carbon atoms, an aryl group having 6 to 10 carbon atoms or an ethylenically unsaturated group; at least one of $R^1$, $R^2$, $R^3$, $R^4$ and $R^5$ is a group having an ethylenically unsaturated group; $R^6$ is a hydrogen atom or an alkyl group having 1 to 6 carbon atoms; v, w, x, y and z represent number of moles and are 0 or a positive number; at least one of w and x is a positive number; 0≤w/(v+x+y+z)≤10 is satisfied.)

[2] The thermosetting composition according to [1] above, wherein the group having the ethylenically unsaturated group is represented by a general formula (2).

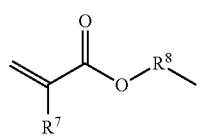
(2)

(In the formula (2), $R^7$ is a hydrogen atom or a methyl group, and $R^8$ is an alkylene group having 1 to 6 carbon atoms.)

[3] The thermosetting composition according to [1] or [2] above, wherein the polymerization initiator comprises an organic peroxide.

[4] The thermosetting composition according to any one of [1] to [3] above, wherein w and x are both a positive number, and $R^1$ is a group having an ethylenically unsaturated group in the formula (1) representing the organosilicon compound.

[5] A cured product obtained by heating the thermosetting composition according to any one of [1] to [4] above.

[6] The cured product of [5] above, wherein a heating temperature of the thermosetting composition is in a range from 60° C. to 200° C.

Effect of the Invention

According to the thermosetting composition of the present invention, a cured product excellent in heat resistance can be obtained. Specifically, a cured film can be obtained without causing cracking or discoloration even if exposed to a heating condition at a temperature from about 100° C. to 150° C. for a long time over several hundreds to thousands hours.

EMBODIMENTS FOR CARRYING OUT THE INVENTION

Hereinafter, the present invention is described in detail. In the description of the present invention, "(meth)acryl" means acryl and methacryl, and "(meth)acrylate" means acrylate and methacrylate. And "(meth)acryloyl group" means acryloyl group and methacryloyl group.

<Organosilicon Compound>

The thermosetting composition of the present invention includes an organosilicon compound represented by the following general formula (1) and a polymerization initiator having a 10-hour half-life temperature of 80° C. to 130° C.

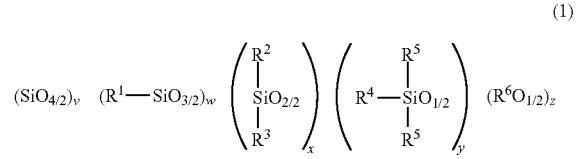
(1)

(In the formula, $R^1$, $R^2$, $R^3$, $R^4$ and $R^5$ are each, independently, a hydrogen atom, or a group having an alkyl group having 1 to 10 carbon atoms, an aralkyl group having 7 to 10 carbon atoms, a cycloalkyl group having 1 to 10 carbon atoms, a cycloaralkyl group having 9 to 12 carbon atoms, an aryl group having 6 to 10 carbon atoms or an ethylenically unsaturated group; at least one of $R^1$, $R^2$, $R^3$, $R^4$ and $R^5$ is a group having an ethylenically unsaturated group; $R^6$ is a hydrogen atom or an alkyl group having 1 to 6 carbon atoms; v, w, x, y and z represent number of moles and are 0 or a positive number; at least one of w and x is a positive number; 0≤w/(v+x+y+z)≤10 is satisfied.)

The organosilicon compound is a compound in which the following monomer units (1-1) to (1-5) are bound by siloxane bonds.

$$(SiO_{4/2}) \quad (1\text{-}1)$$

$$(R^1\text{—}SiO_{3/2}) \quad (1\text{-}2)$$

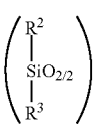
(1-3)

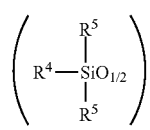
(1-4)

$$(R^6O_{1/2}) \quad (1\text{-}5)$$

In the general formula (1) representing the organosilicon compound according to the present invention, $R^1$, $R^2$, $R^3$, $R^4$ and $R^5$ are each, independently, a hydrogen atom, or a group having an alkyl group having 1 to 10 carbon atoms, an aralkyl group having 7 to 10 carbon atoms, a cycloalkyl group having 1 to 10 carbon atoms, a cycloaralkyl group having 9 to 12 carbon atoms, an aryl group having 6 to 10 carbon atoms or an ethylenically unsaturated group. At least one of $R^1$, $R^2$, $R^3$, $R^4$ and $R^5$ is a group having an ethylenically unsaturated group. $R^1$ is preferably a group having an ethylenically unsaturated group.

At least one of $R^1$, $R^2$, $R^3$, $R^4$ and $R^5$ is a group having an ethylenically unsaturated group. In other cases, $R^1$, $R^2$, $R^3$, $R^4$ and $R^5$ are each preferably a hydrogen atom, a methyl group, or a phenyl group, and more preferably a hydrogen atom or a methyl group for preventing discoloration of the cured product. The two $R^5$s may be identical to or different from each other. When the $R^5$s include a group having an ethylenically unsaturated group, at least one $R^5$ is a group having an ethylenically unsaturated group.

$R^6$ is a hydrogen atom or an alkyl group having 1 to 6 carbon atoms, and is preferably a methyl group, an ethyl group, a propyl group, or a butyl group.

The group having an ethylenically unsaturated group is preferably a group represented by the following general formula (2).

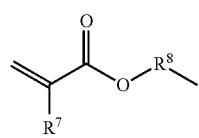
(2)

(In the formula, $R^7$ is a hydrogen atom or a methyl group, and $R^8$ is an alkylene group having 1 to 6 carbon atoms.)

In the general formula (1), at least one of w and x is a positive number, and v, y, and z are not particularly limited.

From the viewpoint of heat resistance of the cured product, w satisfies $0 \leq w/(v+x+y+z) \leq 10$, preferably $0.01 \leq w/(v+x+y+z) \leq 5$, and more preferably $0.1 \leq w/(v+x+y+z) \leq 2$.

In addition, from the viewpoint of heat resistance of the cured product, v preferably satisfies $0 \leq v/(v+w+x+y+z) \leq 1$, and more preferably $0 \leq v/(v+w+x+y+z) \leq 0.4$.

In the present invention, it is preferred that both of w and x be a positive number.

A number average molecular weight of the organosilicon compound is preferably 500 or more from the viewpoint of heat resistance, and is preferably 20000 or less from the viewpoint of viscosity and handling of the organosilicon compound. The number average molecular weight is more preferably in a range from 700 to 10000, and further preferably from 1000 to 6000. This number average molecular weight is a value in terms of standard polystyrene determined by gel permeation chromatography (GPC).

The organosilicon compound according to the present invention can be produced by cohydrolytic condensation of hydrolyzable monomers giving the monomer units composing the general formula (1). Examples of a hydrolyzable group include a halogeno group, an alkoxy group, and the like. Among these, an alkoxy group is preferable, and an alkoxy group having carbon atoms of 1 to 3 because it has good hydrolyzability and forms no acid by-product.

The hydrolyzable group forms a siloxane bond by condensation, and therefore, it is also referred to as a siloxane bond-forming group.

A monomer giving the monomer unit (1-1) is preferably a monomer having four siloxane bond-forming groups in one molecule (hereinafter, referred to as "Q monomer"). A monomer giving the monomer unit (1-2) is preferably a monomer having three siloxane bond-forming groups in one molecule (hereinafter, referred to as "T monomer"). A monomer giving the monomer unit (1-3) is preferably a monomer having two siloxane bond-forming groups in one molecule (hereinafter, referred to as "D monomer"). In addition, a monomer giving the monomer unit (1-4) is preferably a monomer having one siloxane bond-forming group in one molecule (hereinafter, referred to as "M monomer"), or a compound represented by the below-described general formula (3).

The Q monomer forms a three-dimensional crosslinked structure upon condensation. When a composition containing an organosilicon compound obtained by using the Q monomer is cured, the cured product to be obtained tends to have improved heat resistance. If the usage of the Q monomer is too much, the flexibility of the cured product to be obtained may be insufficient. Therefore, the proportion v of the monomer unit derived from the Q monomer satisfies, as described above, preferably $0 \leq v/(v+w+x+y+z) < 1$, and more preferably $0 \leq v/(v+w+x+y+z) < 0.4$.

Examples of the specific compound of the Q monomer include tetramethoxysilane, tetraethoxysilane, tetrapropoxysilane, tetrabutoxysilane, triethoxymethoxysilane, tripropoxymethoxysilane, torimethoxyethoxysilane, trimethoxypropoxysilane, diethoxydimethoxysilane, dimethoxydipropoxysilane, trumethoxysilane, triethoxysilane, tripropoxysilane, dimethoxysilane, diethoxysilane, dipropoxysilane, monomethoxysilane, monoethoxysilane, monopropoxysilane, and the like. The Q monomer may be, when the organosilicon compound is synthesized, a compound prepared by alcohol exchange reaction of at least one of these compounds (excluding tetrapropoxysilane, tripropoxysilane, and dipropoxysilane) in an alcohol such as 1-propanol.

The T-monomer also forms a three-dimensional cross-linked structure upon condensation, and it contributes to the improvement of heat resistance of the cured product. The proportion w of the monomer unit derived from the T monomer satisfies, as described above, $0 \leq w/(v+x+y+z) \leq 10$, preferably $0.01 \leq w/(v+x+y+z) \leq 5$, and more preferably $0.1 \leq w/(v+x+y+z) \leq 2$.

Examples of the specific compound of the T monomer include triethoxysilane, tripropoxysilane, methyltrimethoxysilane, methyltriethoxysilane, benzylmethoxysilane, cyclohexyltrimethoxysilane, phenyltrimethoxysilane, phenyltriethoxysilane, vinyltrimethoxysilane, vinyltriethoxysilane, (p-styryl)trimethoxysilane, (p-styryl)triethoxysilane, (3-methacryloyloxypropyl)trimethoxysilane, (3-methacryloyloxypropyl)triethoxysilane, (3-acryloyloxypropyl)trimethoxysilane, (3-acryloyloxypropyl)triethoxysilane, and the like. Among these, (3-methacryloyloxypropyl)trimethoxysilane, (3-methacryloyloxypropyl)triethoxysilane, (3-acryloyloxypropyl)trimethoxysilane, (3-acryloyloxypropyl)triethoxysilane, and the like are preferred because it is readily available. The T-monomer may be used singly or in combination of two or more types thereof.

The D monomer introduces a silicone unit into the organosilicon compound to be obtained by cocondensation. The D monomer suppresses the viscosity increase of the organosilicon compound, and imparts flexibility to the cured product to be obtained.

Examples of the specific compound of the D monomer include dimethoxydimethylsilane, dimethoxydiethylsilane, diethoxydimethylsilane, diethoxydiethylsilane, dimethoxymethylphenylsilane, diethoxymethylphenylsilane, dimethoxybenzylmethylsilane, dimethoxy(3-methacryloyloxypropyl)methylsilane, diethoxy(3-methacryloyoloxypropyl)methylsilane, dimethoxy(3-acryloyoloxypropyl)methylsilane, diethoxy(3-acryloyoloxypropyl)methylsilane, and the like. Among these, dimethoxydimethylsilane, diethoxydimethylsilane, dimethoxymethylphenylsilane, and the like are preferred because it is readily available. The D-monomer may be used singly or in combination of two or more types thereof.

The M monomer is a compound having one siloxane bond-forming group, and blocks the ends of the joining chain of polysiloxane. Therefore, it may be used for controlling the molecular weight of the organosilicon compound represented by the general formula (1).

Examples of the specific compound of the M monomer include methoxytrimethylsilane, methoxytriethylsilane, ethoxytrimethylsilane, ethoxytriethylsilane, methoxydimethylphenylsilane, ethoxydimethylphenylsilane, trimethylchlorosilane, triethylchlorosilane, trimethylbromosilane, triethylbromosilane, and the like. Among these, trimethylchlorosilane and trimethylbromosilane are preferable and trimethylchlorosilane is particularly preferred because it is low-cost. The M-monomer may be used singly or in combination of two or more types thereof.

As described above, a hydrolyzable organosilicon compound represented by the following general formula (3) may be used. The compound has the same action as the M monomer, so that it can give two monomer units derived from one molecule of the M monomer upon cocondensation.

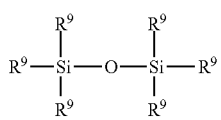

(3)

(In the formula, $R^9$ is a hydrogen atom, an alkyl group having 1 to 10 carbon atoms or a group having an ethylenically unsaturated group; six $R^9$s may be identical to or different from each other.)

Examples of the specific compound of the hydrolyzable organosilicon compound represented by the general formula (3) include 1,1,3,3-tetramethyldisiloxane, 1,1,3,3-tetraethyldisiloxane, hexamethyldisiloxane, hexaethyldisiloxane, hexapropyldisiloxane, divinyltetramethyldisiloxane, 2,2,4,4-tetramethyl-3-oxa-2,4-disilapentane-1,5-diyl bisacrylate, oxybis[dimethylsilylene(3,1-propanediyl)]bismethacrylate, and the like. Among these, hexamethyldisiloxane is preferred because it is readily available.

In the present invention, the silicon compound represented by the general formula (1) is a compound wherein at least one of the T monomer, D monomer, and M monomer has an ethylenically unsaturated group, and is obtained by cohydrolytic condensation of the compounds selected from the Q monomer, T monomer, D monomer, M monomer, and the compound represented by the general formula (3). The compound having an ethylenically unsaturated group is preferably a compound wherein the $R^8$ in the general formula (2) is a propylene group because it is readily available or synthesizable. This reaction may be carried out without catalyst, but is preferably carried out in the presence of a catalyst. Examples of the catalyst include an acidic catalyst, an alkaline catalyst, and a metal compound.

Examples of the acidic catalyst include an inorganic acid and an organic acid. The inorganic and organic acids may be used singly or in combination. Examples of the inorganic acid include hydrochloric acid, sulfuric acid, phosphoric acid, nitric acid, and the like. These compounds may be used singly or in combination of two or more types thereof. Examples of the organic acid include acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethyl hexanoic acid, oleic acid, stearic acid, linolic acid, linoleic acid, salicylic acid, benzoic acid, p-aminobenzoic acid, p-toluenesulfonic acid, benzene sulfonic acid, monochloroacetic acid, dichloroacetic acid, trichloroacetic acid, trifluoroacetic acid, formic acid, malonic acid, sulfonic acid, phthalic acid, fumaric acid, citric acid, tartaric acid, and the like. These compounds may be used singly or in combination of two or more types thereof.

Examples of the basic catalyst include an inorganic base and an organic base. The inorganic and organic bases may be used singly or in combination. Examples of the inorganic base include ammonia, sodium hydroxide, potassium hydroxide, and the like. These compounds may be used singly or in combination of two or more types thereof. Examples of the organic base include pyridine, pyrrole, piperazine, pyrrolidine, piperidine, picoline, monomethylamine, dimethylamine, trimethylamine, monoethylamine, diethylamine, triethylamine, monopropyl amine, dipropylamine, tripropylamine, monobutylamine, dibutylamine, tributylamine, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, and the like. These compounds may be used singly or in combination of two or more types thereof.

Examples of the metal compound include a titanium chelate compound, a zirconium chelate compound, an aluminum chelate compound, and the like. These compounds may be used singly or in combination of two or more types thereof.

The cohydrolytic condensation reaction is preferably carried out in the presence of both of the catalyst and water. When a portion or whole of the siloxane bond-forming groups of the monomer to be used for reaction are hydrolyzable groups, the amount of water used is preferably at least the total amount of the equivalence of the hydrolyzable groups. The upper limit of the water amount in the reaction system is preferably 100 times the total amount of the equivalence of the hydrolyzable groups.

A simple method is that the reaction temperature during condensation reaction is kept at a specified temperature, but it is also preferred that the temperature be increased gradually. If the reaction temperature is too high, the control of the reaction is difficult, and a great energy cost is required. If an ethylenically unsaturated bond is contained in the raw material, decomposition may be caused. On the other hand, if the reaction temperature is too low, the reaction takes a long time, and hydrolytic polycondensation is insufficiently achieved. Accordingly, the upper limit temperature is preferably 100° C., more preferably 80° C., and further preferably 60° C. The lower limit temperature is preferably 0° C., more preferably 15° C., and further preferably 25° C.

In the condensation reaction, the monomer forming the organosilicon compound represented by the general formula (1), a catalyst, and a reaction solvent for dissolving other components may be used. The reaction solvent is preferably a compound having one alcoholic hydroxyl group in its molecule, such as an alkyl alcohol and a propylene glycol monoalkyl ether. Specific examples of the reaction solvent include methanol, ethanol, 1-propanol, 2-propanol, 1-butanol, 2-butanol, isobutyl alcohol, t-butyl alcohol, 2-methyl-1-butanol, 3-methyl-1-butanol, 2,2-methyl-1-propanol, 1-pentanol, 2-pentanol, 1-octanol, 3-methyl-2-butanol, 3-pentanol, 2-methyl-2-butanol, cyclpentanol, propylene glycol monomethyl ether, propylene glycol monoethyl ether, propylene glycol monopropyl ether, propylene glycol monobutyl ether, and the like. The reaction solvent may be used singly or in combination of two or more types thereof.

In the present invention, a compound having a boiling point of below 100° C. is preferred as the reaction solvent, because it is readily removed by volatilization after condensation reaction. Examples of the reaction solvent having this property include methanol, ethanol, 1-propanol, 2-propanol, 2-butanol and t-butyl alcohol. It is particularly preferably an alcohol selected from these alcohols.

The silicon compound represented by the general formula (1) has an ethylenically unsaturated bond in its molecule. When applying it to a base material or the like, forming a coating film containing the compound and a polymerization initiator, and then heat-curing the film, a cured product (cured film) excellent in heat resistance can be obtained.

<Polymerization Initiator>

The thermosetting composition of the present invention includes a polymerization initiator having a 10-hour half-life temperature of 80° C. to 130° C. The polymerization initiator is not particularly limited as long as the 10-hour half-life temperature is in a range from 80° C. to 130° C. A known polymerization initiator such as an organic peroxide and an azo compound may be used. When a polymerization initiator having a 10-hour half-life temperature of below 80° C. is used singly, the cured product to be obtained have insufficient heat resistance, and the cured product may cause cracking in the heat resistance test. If a polymerization initiator having a 10-hour half-life temperature of beyond 130° C. is used singly, the curing rate is low, and the progress of curing tends to be insufficient. Heat resistance also tends to be insufficient. The 10-hour half-life temperature of the polymerization initiator according to the present invention is preferably in a range from 90° C. to 120° C., and more preferably from 95° C. to 110° C.

Examples of the organic peroxide having a 10-hour half-life temperature in a range from 80° C. to 130° C. include 1,1-di(t-butylperoxy)-2-methylcyclohexane (10-hour half-life temperature: 83.2° C.), 1,1-di(t-hexylperoxy)-3,3,5-trimethylcyclohexane (10-hour half-life temperature: 86.7° C.), 1,1-di(t-hexylperoxy)cyclohexane (10-hour half-life temperature: 87.1° C.), 1,1-di(t-butylperoxy)cyclohexane (10-hour half-life temperature: 90.7° C.), 2,2-di(4,4-di(t-butylperoxy)cyclohexyl)propane (10-hour half-life temperature: 94.7° C.), t-hexyl peroxyisopropyl monocarbonate (10-hour half-life temperature: 95.0° C.), t-butylperoxymaleic acid (10-hour half-life temperature: 96.1° C.), t-butylperoxy-3,3,5-trimethylhexanoate (10-hour half-life temperature: 97.1° C.), t-butyl peroxylaurate (10-hour half-life temperature: 98.3° C.), t-butylperoxyisopropyl monocarbonate (10-hour half-life temperature: 98.7° C.), t-butylperoxy 2-ethylhexyl monocarbonate (10-hour half-life temperature: 99.0° C.), t-hexyl peroxybenzoate (10-hour half-life temperature: 99.4° C.), 2,5-dimethyl-2,5-di(benzoylperoxy)hexane (10-hour half-life temperature: 99.7° C.), t-butylperoxyacetate (10-hour half-life temperature: 101.9° C.), 2,2-di(t-butylperoxy)butane (10-hour half-life temperature: 103.1° C.), t-butylperoxybenzoate (10-hour half-life temperature: 104.3° C.), n-butyl 4,4-di(t-butylperoxy)valerate (10-hour half-life temperature: 104.5° C.), di(2-t-butylperoxyisopropyl)benzene (10-hour half-life temperature: 119.2° C.), dicumyl peroxide (10-hour half-life temperature: 116.4° C.), di-t-hexyl peroxide (10-hour half-life temperature: 116.4° C.), 2,5-dimethyl-2,5-di(t-butylperoxy)hexane (10-hour half-life temperature: 117.9° C.), t-butylcumyl peroxide (10-hour half-life temperature: 119.5° C.), di-t-butyl peroxide (10-hour half-life temperature: 123.7° C.), p-menthane hydroperoxide (10-hour half-life temperature: 128.0° C.), 2,5-dimethyl-2,5-di(t-butylperoxyhexyne-3) (10-hour half-life temperature: 128.4° C.), and the like. These organic peroxides may be used singly or in combination of two or more types thereof.

Examples of the azo compound having a 10-hour half-life temperature in a range from 80° C. to 130° C. include 2,2'-azobis[2-methyl-N-(2-hydroxyethyl)propionamide] (10-hour half-life temperature: 86° C.), 1,1'-azobis(cyclohexane-1-carbonitrile) (10-hour half-life temperature: 88° C.), 2,2'-azobis[N-(propenyl)-2-methylpropionamide] (10-hour half-life temperature: 96° C.), 1-[(1-cyano-1-methylethyl)azo]formamide (10-hour half-life temperature: 104° C.), 2,2'-azobis(N-butyl-2-methylpropionamide) (10-hour half-life temperature: 110° C.), and the like. These organic peroxides may be used singly or in combination of two or more types thereof.

As the polymerization initiator, a compound having a 10-hour half-life temperature in a range from 80° C. to 130° C. may be used singly or in combination of two or more types thereof. The polymerization initiator according to the present invention may be used in combination with a polymerization initiator having a 10-hour half-life temperature of below 80° C. or a polymerization initiator having a 10-hour half-life temperature of higher than 130° C. In particular, when the polymerization initiator according to the present invention and a polymerization initiator having a 10-hour half-life temperature of below 80° C. are used in combination, the thermosetting composition of the present invention may be effectively heat-cured.

Examples of the organic peroxide that is a polymerization initiator having a 10-hour half-life temperature lower than 80° C. include t-butylperoxy 2-ethylhexanoate (10-hour half-life temperature: 72.1° C.), t-hexylperoxy 2-ethylhexanoate (10-hour half-life temperature: 69.9° C.), 1,1,3,3,-tetramethylbutylperoxy 2-ethylhexanoate (10-hour half-life temperature: 65.3° C.), dilauroyl peroxide (10-hour half-life temperature: 61.6° C.), t-butyl peroxypivalate (10-hour half-life temperature: 54.6° C.), t-hexyl perpivalate (10-hour half-life temperature: 53.2° C.), t-butyl peroxyneoheptanoate (10-hour half-life temperature: 50.6° C.), and the like.

Examples of the azo compound include 2,2'-azobis(2-methylbutyronitrile) (10-hour half-life temperature: 67° C.), dimethyl 2,2'-azobis(2-methylpropionate) (10-hour half-life temperature: 66° C.), 2,2'-azobis(isobutyronitrile) (10-hour half-life temperature: 65° C.), 2,2'-azobis(2,4-dimethylvaleronitrile) (10-hour half-life temperature: 51° C.), and the like.

In the thermosetting composition of the present invention, a content of the polymerization initiator is in a range from 0.01 to 10 parts by mass, preferably from 0.1 to 8 parts by mass, and more preferably from 0.3 to 5 parts by mass based on 100 parts by mass of the organosilicon compound represented by the general formula (1). If the content of the polymerization initiator is less than 0.01 parts by mass, the curing reaction may not thoroughly proceed. On the other hand, if it is more than 10 parts by mass, the initiator may not effectively act on the curing reaction.

In a case where a polymerization initiator having a 10-hour half-life in a range from 80° C. to 130° C. and a polymerization initiator having a 10-hour half-life out of a range from 80° C. to 130° C. are used in combination, a content ratio of the polymerization initiator having a 10-hour half-life in a range from 80° C. to 130° C. is preferably 10% or more by mass, more preferably 30% or more by mass, and further preferably 50% or more by mass based on a total amount of the polymerization initiators, thereby sufficiently achieving the effect of the present invention.

<Thermosetting Composition>

The thermosetting composition of the present invention may be a composition consisting of the organosilicon compound represented by the general formula (1) and a polymerization initiator having a 10-hour half-life temperature in a range from 80° C. to 130° C., or a composition wherein these components are dissolved in an organic solvent according to a type of the organosilicon compound. The organic solvent is not particularly limited, and may be the reaction solvent used for the synthesis of the organosilicon compound. In addition, the use of the same compound as the reaction solvent is economical and more preferred.

Examples of the preferable organic solvent include the alcohol compound listed above as the reaction solvent; an aromatic compound such as toluene and xylene; an ester compound such as propylene glycol monomethyl ether acetate, ethyl acetate and butyl acetate; a ketone such as acetone, methylethylketone and methylisobutylketone; an ether such as dibutyl ether; N-methylpyrrolidone, and the like.

The usage of the organic solvent is preferably in a range from 10 to 1000 parts by mass, more preferably from 50 to 500 parts by mass, and further preferably from 50 to 300 parts by mass based on 100 parts by mass of a nonvolatile component containing the organosilicon compound represented by the general formula (1).

When the usage of the organic solvent is from 10 to 1000 parts by mass, the viscosity of the thermosetting composition can be adjusted to a value suitable for the below-described known application method. A paint composition suitable for the application method is easy to prepare.

The thermosetting composition of the present invention may contain other components as long as its storage stability and heat resistance of the cured product will not be impaired. Examples of the other components include a polymerizable unsaturated compound, a radical polymerization inhibitor, an antioxidant, an ultraviolet absorber, a light stabilizer, a surface conditioner, an organic polymer, a filler, a metal particle, a pigment, and the like.

The polymerizable unsaturated compound is preferably a compound having an ethylenically unsaturated bond, more preferably a (meth)acrylate compound having a (meth) acryloyl group, and further preferably a monofunctional (meth)acrylate, a polyfunctional (meth)acrylate, and the like. These compounds may be used singly or in combination of two or more types thereof. When a polyfunctional (meth)acrylate compound is used, the cured product to be obtained can form a crosslinked structure.

Specific examples of the monofunctional (meth)acrylate include methyl(meth)acrylate, ethyl(meth)acrylate, butyl (meth)acrylate, 2-ethylhexyl(meth)acrylate, cyclohexyl (meth)acrylate, isobornyl(meth)acrylate, dicyclopentenyl (meth)acrylate, dicyclopentanyl(meth)acrylate, 2-hydroxyethyl(meth)acrylate, benzyl(meth)acrylate, styrene, 2-hydroxypropyl(meth)acrylate, 4-hydroxybutyl (meth)acrylate, (meth)acrylates of phenol alkylene oxide adducts, (meth)acrylates of alkylphenol alkylene oxide adducts, and the like.

The polyfunctional (meth)acrylate may be added for the purpose of, for example, improving adhesiveness between the cured product and base material, hardness and scratch resistance of the cured product. A number of the ethylenically unsaturated group in the polyfunctional (meth)acrylate is preferably from 3 to 20 in one molecule, thereby preventing the decrease of hardness and scratch resistance.

Specific examples of the polyfunctional (meth)acrylate include the following compounds:
di(meth)acrylates of bisphenol A alkylene oxide adducts, di(meth)acrylates of bisphenol F alkylene oxide adducts, di(meth)acrylates of bisphenol Z alkylene oxide adducts, di(meth)acrylates of bisphenol S alkylene oxide adducts, di(meth)acrylates of thiobisphenol alkylene oxide adducts, bisphenol A di(meth)acrylate, bisphenol F di(meth)acrylate, bisphenol Z di(meth)acrylate, bisphenol S di(meth)acrylate, thiobisphenol di(meth)acrylate, tricyclodecane dimethylol di(meth)acrylate, ethylene glycol di(meth)acrylate, polyethylene glycol di(meth)acrylate, propylene glycol di(meth) acrylate, polypropylene glycol di(meth)acrylate, neopentyl glycol di(meth)acrylate, 1,6-hexanediol di(meth)acrylate, 1,9-nonanediol di(meth)acrylate, glycerol di(meth)acrylate, di(meth)acrylates of glycerol alkylene oxide adducts, dimer acid diol di(meth)acrylate, cyclohexane dimethylol di(meth) acrylate, trimethylolpropane tri(meth)acrylate, tri(meth) acrylates of trimethylolpropane alkylene oxide adducts, tri and tetraacrylates of pentaerythritol, tri and tetraacrylates of pentaerythritol alkylene oxide adducts, ditrimethylolpropane tetra(meth)acrylate, dipentaerythritol hexa and pentaacrylate, polyester (meth)acrylate, epoxy (meth)acrylate, urethane (meth)acrylate, silicone resins having (meth)acryloyl end groups, and the like.

Examples of the polyester (meth)acrylate include dehydration condensates of polyester polyol and (meth)acrylic acid. Examples of the polyester polyol include a low molecular weight polyol such as ethylene glycol, polyethylene glycol, cyclohexane dimethylol, 3-methyl-1,5-pentanediol, propylene glycol, polypropylene glycol, 1,6-hexanediol, and trimethylolpropane; a reaction product between a polyol such as an alkylene oxide adduct of the low molecular weight polyol, and an acid component of a dibasic acid such as adipic acid, succinic acid, phthalic acid, hexahydrophthalic acid and terephthalic acid, or an anhydride thereof; and a dehydration condensate of various dendrimer polyols and (meth)acrylic acid.

Examples of the epoxy (meth)acrylate include (meth) acrylic acid adducts of bisphenol A epoxy resins, (meth) acrylic acid adducts of hydrogenated bisphenol A epoxy resins, (meth)acrylic acid adducts of phenol or cresol novolac epoxy resins, (meth)acrylic acid adducts of biphenyl epoxy resins, (meth)acrylic acid adducts of polyether diglycidyl ether such as (meth)acrylic acid adducts of polytetramethylene glycol diglycidyl ether, (meth)acrylic acid adducts of polybutadiene diglycidyl ether, (meth)acrylic acid adducts of polybutadiene internal epoxy compounds, (meth)acrylic acid adducts of silicone resins having epoxy groups, (meth)acrylic acid adducts of limonene dioxide, (meth)acrylic acid adducts of 3,4-epoxycyclohexyl methyl-3,4-epoxy cyclohexane carboxylate, and the like.

Examples of the urethane (meth)acrylate include a compounds prepared by addition reaction of an organic polyisocyanate and a hydroxyl group-containing (meth)acrylate, and a compound prepared by addition reaction of an organic polyisocyanate, a polyol and a hydroxyl group-containing (meth)acrylate.

Examples of the polyol include a low molecular weight polyol, a polyether polyol, a polyester polyol, a polycarbonate polyol, and the like.

Examples of the low molecular weight polyol include ethylene glycol, propylene glycol, neopentyl glycol, cyclohexane dimethylol, 3-methyl-1,5-pentanediol, glycerol, and the like.

Examples of the polyether polyol include polypropylene glycol, polytetramethylene glycol, and the like.

Examples of the polyester polyol include reaction products between any of these low molecular weight polyols and/or polyether polyols and an acid component such as dibasic acid or its anhydride, such as adipic acid, succinic acid, phthalic acid, hexahydrophthalic acid, and terephthalic acid.

Examples of the organic polyisocyanate include tolylene diisocyanate, xylylene diisocyanate, tetramethylxylylene diisocyanate, 4,4'-diphenylmethane diisocyanate, 4,4'-dicyclohexyl methane diisocyanate, hexamethylene diisocyanate, isophorone diisocyanate, and the like.

Examples of the hydroxyl group-containing (meth)acrylate include a hydroxyl alkyl (meth)acrylate such as 2-hydroxyethyl(meth)acrylate, 2-hydroxypropyl(meth)acrylate, 4-hydroxybutyl(meth)acrylate, and the like.

Examples of the radical polymerization inhibitor for stabilizing an ethylenically unsaturated bond include a phenolic compound such as hydroquinone and hydroquinone monomethyl ether, an N-nitrosophenyl hydroxylamine salt, and the like.

Examples of the antioxidant include a hindered phenol antioxidant such as 2,6-di-tert-butyl-4-methylphenol, pentaerythritol tetrakis(3-(3,5-di-tert-butyl-4-hydroxyphenyl) propionate), a sulfur secondary antioxidant such as 4,6-bis (octyl thiomethyl)-o-cresol, a phosphorus secondary antioxidant, and the like. These compounds may be used singly or in combination of two or more types thereof. When a radical polymerization inhibitor and an antioxidant are used in combination, storage stability of the thermosetting composition and thermal stability of the cured product are improved.

When the thermosetting composition of the present invention contains a radical polymerization inhibitor, a content of the radical polymerization inhibitor is preferably in a range from 1 to 10,000 parts by mass, more preferably from 10 to 2,000 parts by mass, and further preferably from 100 to 500 parts by mass based on 1,000,000 parts by mass of the organosilicon compound represented by the general formula (1).

When the thermosetting composition of the present invention contains an antioxidant, a content of the antioxidant is preferably in a range from 1 to 10,000 parts by mass, more preferably from 10 to 2,000 parts by mass, and further preferably from 100 to 500 parts by mass based on 1,000,000 parts by mass of the organosilicon compound represented by the general formula (1).

Examples of the ultraviolet absorber include a hydroxyphenyl triazine ultraviolet absorber such as 2-[4-[(2-hydroxy-3-dodecyloxypropyl)oxy]-2-hydroxyphenyl]-4,6-bis (2,4-dimethylphenyl)-1,3,5-triazine; a benzotriazole ultraviolet absorber such as 2-(2H-benzotriazole-2-yl)-4,6-bis(1-methyl-1-phenylethyl)phenol; an inorganic fine particle absorbing ultraviolet light, such as titanium oxide fine particle and zinc oxide fine particle; and the like. These compounds may be used singly or in combination of two or more types thereof. Examples of the light stabilizer include a hindered amine light stabilizer such as bis(1,2,2,6,6-pentamethyl-4-piperidinyl) sebacate, and the like. When the ultraviolet absorber or light stabilizer are used, UV resistance or weather resistance is improved.

Examples of the surface conditioner include a silicone-based surface conditioner, a fluorine-based surface conditioner, and the like. Specific examples of the silicone-based surface conditioner include a silicone-based polymer having a silicone chain and a polyalkylene oxide chain, and the like. Examples of the fluorine-based surface conditioner include a fluorine-based polymer having a perfluoroalkyl group and a polyalkylene oxide chain, and a fluorine-based polymer having a perfluoroalkyl ether chain and a polyalkylene oxide chain. When the surface conditioner is used, the leveling properties are improved while suppressing the generation of bubbles during application, or surface smoothness, stain resistance, and lubricity of the cured film are improved.

When the thermosetting composition of the present invention contains a surface conditioner, a content of the surface conditioner is preferably in a range from 0.01 to 3 parts by mass, and more preferably from 0.02 to 5 parts by mass based on 100 parts by mass of the organosilicon compound represented by the general formula (1).

Example of the organic polymer include a (meth)acrylic polymer, and preferred examples of the component monomer include methyl methacrylate, cyclohexyl(meth)acrylate, N-(2-(meth)acryloxyethyl)tetrahydrophthalimide, and the like.

Examples of the filler include silica filler, alumina filler, and the like.

In the thermosetting composition of the present invention, a content ratio of the organosilicon compound represented by the general formula (1) is preferably in a range from 1% to 99.5% by mass, more preferably from 10% to 99% by mass, and furtherpreferably from 30% to 90% by mass based on the whole thermosetting composition.

The cured product of the present invention is obtained by applying to a base material or the like, or molding the thermosetting composition of the present invention and then subjecting it to heat treatment.

Specific examples of the method for applying the thermosetting composition of the present invention include bar coating, roll coating, spin coating, dip coating, gravure coating, die coating, flow coating, spray coating, and the like. After applying the composition to a base material, the coating film is subjected to heat treatment using a dryer, a drying furnace or the like, whereby a cured film is formed.

Conditions of application of the composition to a base material, and a film thickness after curing may be appropriately established according to the intended use, and the thickness of the cured film is about 1 to 300 μm.

When the thermosetting composition of the present invention is molded, known molding method may be applied. Specific examples of molding method include extrusion molding, injection molding, slip casting, compression molding, and the like.

A heating temperature for heat treatment is selected according to types of the base material to be used and the intended use, and is usually about in a range from 60° C. to 200° C. The heating temperature is preferably in a range from 80° C. to 170° C., and more preferably from 100° C. to 150° C. The heating time is about one minute to several hours.

When the heat treatment is conducted, at least a part of ethylenically unsaturated bonds in the organosilicon compound represented by the general formula (1) are polymerized, whereby the organosilicon compound is crosslinked to give a cured product. Since the cured product of the present invention contains a crosslinked structure by polymerization of ethylenically unsaturated bonds, it has higher flexibility and gave better adhesiveness to the base material than a cured product which has been cured only by condensation reaction. In addition, since the cured product of the present invention also contains a crosslinked structure by condensation reaction, it has a crosslinked structure having higher heat resistance than a prior art cured product which has been polymerized only by polymerization of ethylenically unsaturated bonds. This heat resistance prevents the occurrence of cracking and discoloration such as yellowing when exposed to heating conditions for a long time. In particular, discoloration is more highly prevented with the increase of the percentage by mass of the inorganic part of the [$SiO_x$] portion in the organosilicon compound represented by the general formula (1). The proportion of an inorganic part is preferably 40% or higher by mass, more preferably 43% or higher by mass, and further preferably 47% or higher by mass. The proportion of the inorganic part is a value showing the proportion of a silicic acid component ($SiO_2$, $SiO_{3/2}$, $SiO_{2/2}$, and $SiO_{1/2}$) contained in the theoretical yield on the assumption that the alkoxysilanes as the Q, T, D, and M monomers, which have been added as raw materials for synthesizing an organosilicon compound, are entirely hydrolyzed into $SiO_{4/2}$, $SiO_{3/2}$, $SiO_{2/2}$, and $SiO_{1/2}$, respectively, and calculated by the following formula.

Proportion of inorganic part (%)=(silicic acid component in the theoretical yield/theoretical yield)×100

As described above, when the composition is subjected to heat treatment, a polymerization reaction according to the ethylenically unsaturated bond contained in the organosilicon compound represented by the general formula (1) is progressed.

A reaction rate of the ethylenically unsaturated bond determined by the IR spectrum of the cured product is as high as 80% or more. The inventors assume that the cured product to be obtained has high heat resistance because crosslinking reaction based on the ethylenically unsaturated bond contained in the organosilicon compound represented by the general formula (1) sufficiently proceeds. The reaction rate of the ethylenically unsaturated bond is preferably 85% or more, and further preferably 90% or more.

From the above reasons, the cured product of the present invention is excellent in physical properties such as hardness, mechanical strength, chemical resistance, and adhesiveness to a base made of a metal, glass, resin, or the like as well as heat resistance.

EXAMPLES

Hereinafter, the present invention is specifically described using Examples. The present invention is not limited to the Examples. In the following description, "part(s)" means part(s) by mass, and "%" means % by mass. "AC-" represents an acryloyl oxypropyl group, and "MAC-" represents a methacryloyloxy propyl group.

Firstly, organosilicon compounds used in Examples and Comparative Examples, more specifically the organosilicon compounds represented by the general formula (1) are described.

The number average molecular weight of the organosilicon compound was measured by gel permeation chromatography (GPC), and calculated in terms of standard polystyrene.

The proportion of an inorganic part in the organosilicon compound was calculated by the above-described method.

Synthesis Example 1

Synthesis of Organosilicon Compound S1

725.96 g (2500 mmol) of 3-methacryloyloxypropyltrimethoxysilane, 725.96 g (6039 mmol) of dimethoxydimethylsilane, and 432.72 g of 2-propanol were charged into a reaction vessel equipped with a stirrer, a dropping funnel, a reflux cooling tube, and a thermometer. The temperature was increased using a hot water bath. When the temperature in the reaction system exceeded 40° C., 355.59 g of 0.79% aqueous hydrochloric acid solution was dropped from the dropping funnel with the reaction system stirred. After completing the dropping at about 50° C., the reaction system was allowed to stand at room temperature (about 25° C.) for 8 hours. To the vessel, 0.18 g of p-methoxyphenol was added and dissolved, and then a solvent was evaporated under reduced pressure with air blown thereinto, whereby 883 g of the organosilicon compound S1 in the state of a colorless transparent liquid was obtained. The viscosity of the organosilicon compound S1 thus obtained was 151 mPa·s (25° C.), and the number average molecular weight was 1700. The proportion of an inorganic part was 44.3% as calculated from the usage of the raw materials.

The organosilicon compound S1 was subjected to $^1$H-NMR analysis. The composition ratio between a unit having a methacryloyl group (MAC-SiO$_{3/2}$) and a unit having a dimethyl group (Me$_2$-SiO$_{2/2}$) was close to a molar ratio at a time when the raw materials forming these units were charged, and calculated as v=0, w=1.00, x=2.36, y=0, and z=0.07.

Synthesis Example 2

Synthesis of Organosilicon Compound S2

55.88 g (225 mmol) of 3-methacryloyloxypropyltrimethoxysilane, 162.30 g (1350 mmol) of dimethoxydimethylsilane, and 81.14 g of 2-propanol were charged into a reaction vessel equipped with a stirrer, a dropping funnel, a reflux cooling tube, and a thermometer. The temperature was increased using a hot water bath. When the temperature in the reaction system exceeded 40° C., 61.39 g of 0.94% aqueous hydrochloric acid solution was dropped from the dropping funnel with the reaction system stirred. After completing the dropping at about 50° C., the reaction system was allowed to stand at room temperature (about 25° C.) for 23 hours. To the vessel, 0.028 g of p-methoxyphenol was added and dissolved, and then a solvent was evaporated under reduced pressure with air blown thereinto, whereby 128 g of the organosilicon compound S2 in the state of a colorless transparent liquid was obtained. The viscosity of the organosilicon compound S2 thus obtained was 56 mPa·s (25° C.), and the number average molecular weight was 1500. The proportion of an inorganic part was 50.3% as calculated from the usage of the raw materials.

The organosilicon compound S2 was subjected to $^1$H-NMR analysis. The composition ratio between a unit having a methacryloyl group (MAC-SiO$_{3/2}$) and a unit having a dimethyl group (Me$_2$-SiO$_{2/2}$) was generally close to the molar ratio at the time when the raw materials forming these units were charged, and calculated as v=0, w=1.00, x=5.13, y=0, and z=0.11.

Synthesis Example 3

Synthesis of Organosilicon Compound S3

37.25 g (150 mmol) of 3-methacryloyloxypropyltrimethoxysilane, 45.67 g (300 mmol) of tetramethoxysilane, 108.20 g (900 mmol) of dimethoxydimethylsilane, 108.18 g of 2-propanol were charged into a reaction vessel equipped with a stirrer, a dropping funnel, a reflux cooling tube, and a thermometer. The temperature was increased using a hot water bath. When the temperature in the reaction system exceeded 40° C., 62.66 g of 0.79% aqueous hydrochloric acid solution was dropped from the dropping funnel with the reaction system stirred. After completing the dropping at about 50° C., the reaction system was allowed to stand at room temperature (about 25° C.) for 23 hours. To the vessel, 0.022 g of p-methoxyphenol was added and dissolved, and then a solvent was evaporated under reduced pressure with air blown thereinto, whereby 110 g of the organosilicon compound S3 in the state of a colorless transparent liquid was obtained. The viscosity of the organosilicon compound S3 thus obtained was 3180 mPa·s (25° C.), and the number average molecular weight was 3200. The proportion of an inorganic part was 58.7% as calculated from the usage of the raw materials.

The organosilicon compound S3 was subjected to $^1$H-NMR analysis. The composition ratio between a unit having a methacryloyl group (MAC-SiO$_{3/2}$) and a unit having a dimethyl group (Me2-SiO$_{2/2}$) was close to the molar ratio at the time when the raw materials forming these units were charged, and calculated as w=1.00, x=6.06, y=0, and z=0.34.

Synthesis Example 4

Synthesis of Organosilicon Compound S4

29.80 g (120 mmol) of 3-methacryloyloxypropyltrimethoxysilane, 36.53 g (240 mmol) of tetramethoxysilane, 86.56 g (720 mmol) of dimethoxydimethylsilane, 4.87 g (30 mmol) of hexamethyldisiloxane, and 54.09 g of 2-propanol were charged into a reaction vessel equipped with a stirrer, a dropping funnel, a reflux cooling tube, and a thermometer. The temperature was increased using a hot water bath. When the temperature in the reaction system exceeded 40° C., 50.15 g of 0.83% aqueous hydrochloric acid solution was dropped from the dropping funnel with the reaction system stirred. After completing the dropping at about 50° C., the reaction system was allowed to stand at room temperature (about 25° C.) for 20 hours. To the vessel, 0.018 g of p-methoxyphenol was added and dissolved, and then a solvent was evaporated under reduced pressure with air blown thereinto, whereby 93 g of the organosilicon compound S4 in the state of a colorless transparent liquid was obtained. The viscosity of the organosilicon compound S4 thus obtained was 1290 mPa·s (25° C.), and the number average molecular weight was 2200. The proportion of an inorganic part was 58.3% as calculated from the usage of the raw materials.

The organosilicon compound S4 was subjected to $^1$H-NMR analysis. The composition ratio between a unit having a methacryloyl group (MAC-SiO$_{3/2}$) and a unit having a dimethyl group (Me$_2$-SiO$_{2/2}$) was close to the molar ratio at the time when the raw materials forming these units were charged, and calculated as w=1.00, x=6.02, y=0.97, and z=0.24.

Synthesis Example 5

Synthesis of Organosilicon Compound S5

372.53 g (1500 mmol) of 3-methacryloyloxypropyltrimethoxysilane, 109.05 g (907.1 mmol) of dimethoxydimethylsilane, and 166.18 g of 2-propanol were charged into a reaction vessel equipped with a stirrer, a dropping funnel, a reflux cooling tube, and a thermometer. The temperature was increased using a hot water bath. When the temperature in the reaction system exceeded 40° C., 114.66 g of 0.77% aqueous hydrochloric acid solution was dropped from the dropping funnel with the reaction system stirred. After completing the dropping at about 50° C., the reaction system was allowed to stand at room temperature (about 25° C.) for 18 hours. To the vessel, 0.067 g of p-methoxyphenol was added and dissolved, and then a solvent was evaporated under reduced pressure with air blown thereinto, whereby 330 g of the organosilicon compound S5 in the state of a colorless transparent liquid was obtained. The viscosity of the organosilicon compound S5 thus obtained was 1170 mPa·s (25° C.), and the number average molecular weight was 1300. The proportion of an inorganic part was 35.1% as calculated from the usage of the raw materials.

The organosilicon compound S5 was subjected to $^1$H-NMR analysis. The composition ratio between a unit having a methacryloyl group (MAC-SiO$_{3/2}$) and a unit having a dimethyl group (Me$_2$-SiO$_{2/2}$) was close to the molar ratio at the time when the raw materials forming these units were charged, and calculated as v=0, w=1.00, x=0.59, y=0, and z=0.11.

1. Production and Evaluation of Thermosetting Composition (1)

Examples 1 to 3 and Comparative Examples 1 and 2

The organosilicon compound and polymerization initiator were mixed under stirring at a proportion shown in Table 1, whereby a thermosetting composition was prepared.

The obtained thermosetting composition was used to prepare a cured sample by the following method, and the cured product was evaluated for the reaction rate, appearance, indentation elastic modulus, and heat resistance. The results are shown in Table 1.

[1] Preparation of Cured Product

A silicon rubber having a thickness of 2 mm and a rectangular punched hole (6 cm×1.5 cm) was placed on a PET film, a thermosetting composition was poured into the punched hole, and then a PET film was overlaid thereon. This object was sandwiched between two glass plates, heated at a temperature of 120° C. for 1 hour, and then further heated at 150° C. for 1 hour, whereby a cured product having a thickness of 2 mm was obtained.

[2] Reaction Rate

The cured product was subjected to IR measurement, and the reaction rate was determined by observing a C=C characteristic absorption derived from the (meth)acryloyl group.

[3] Indentation Elastic Modulus

The cured product was measured at three points using a microhardness test system "FISHERSCOPE H-100" manufactured by Fischer Instruments K.K., at a load speed of 20 mN/10 second and a retention time of 5 seconds, whereby the average of the indentation elastic modulus was determined. In general, the higher the elastic modulus, the higher the hardness becomes.

[4] Heat Resistance Test (a)

The cured product was allowed to stand in a dryer adjusted at a temperature of 150° C. for 200 hours. Thereafter, the appearance of the cured product was observed, and a heat resistance was evaluated based on the presence or absence of cracks.

TABLE 1

| | | | Example 1 | Example 2 | Example 3 | Comparative Example 1 | Comparative Example 2 |
|---|---|---|---|---|---|---|---|
| Raw material for composition | Organosilicon compound S1 | | 100 | 100 | 100 | 100 | 100 |
| | Polymerization initiator | PBO | — | 1 | 1 | 1 | 3 |
| | | PHI | — | — | 1 | — | — |
| | | PBE | 3 | 2 | 1 | — | — |
| Cured product | Reaction rate (%) | | 96 | 87 | 93 | 68 | 69 |
| | Appearance | | Transparent | Transparent | Transparent | Transparent | Transparent |
| | Indentation elastic modulus | | 1.06 | 0.95 | 1.03 | — | 0.84 |
| | Heat resistance (cracking) | | None | None | None | Cracked | Cracked |

Details of the polymerization initiators in Table 1 are shown below.

PBO: t-butyl peroxy 2-ethylhexanoate (manufactured by NOF corporation, trade name "PERBUTYL O", 10-hour half-life temperature: 72.1° C.)

PHI: t-hexyl peroxyisopropyl monocarbonate (manufactured by NOF corporation, trade name "PERHEXYL I", 10-hour half-life temperature: 95.0° C.)

PBE: t-butyl peroxy 2-ethylhexyl monocarbonate (manufactured by NOF corporation, trade name "PERBUTYL E", 10-hour half-life temperature: 99.0° C.)

Examples 1 to 3 are experiments using the polymerization initiator in which 10-hour half-life temperature is within the range defined in the present invention. The reaction rate of the ethylenically unsaturated bonds contained in the organosilicon compound was high (87% to 96%), no cracking occurred even after the heat resistance test (a) of the cured product, and high heat resistance was exhibited.

On the other hand, in Comparative Examples 1 and 2, the reaction rate of the ethylenically unsaturated bonds in the cured product obtained was low, and the occurrence of cracking was observed after the heat resistance test (a).

2. Production and Evaluation of Thermosetting Composition (2)

Examples 4 to 8

The organosilicon compound and polymerization initiator were mixed under stirring in the proportion shown in Table 2, whereby a thermosetting composition was prepared. The composition in Example 4 is the same as that in Example 3. A cured product was then prepared by the method described in the following section [5]. The cured product was subjected to the evaluation of appearance, and the evaluation of the heat resistance test (b) by the method described in the following section [6]. The results are shown in Table 2.

[5] Preparation of Cured Product

A silicon rubber having a thickness of 1 mm and a rectangular punched hole (6 cm×1.5 cm) was placed on a PET film, a thermosetting composition was poured into the punched hole, and then a PET film was overlaid thereon. This object was sandwiched between two glass plates, heated at a temperature of 110° C. for 1 hour, and then further heated at 150° C. for 1 hour, whereby a cured product having a thickness of 1 mm was obtained.

[6] Heat Resistance Test (b)

The cured product was allowed to stand in a dryer adjusted at a temperature of 150° C. for 500 hours. Thereafter, the yellowness (Y.I.: yellow index) of the cured product was measured using a color-difference meter "DOT-3C" manufactured by Murakami Color Research Laboratory Co., Ltd. with a D65 light source and at a viewing angle of 10°. The measurement was made on two points on the surface of the cured product, and the average was determined.

TABLE 2

|  |  | Example 4 | Example 5 | Example 6 | Example 7 | Example 8 |
|---|---|---|---|---|---|---|
| Raw material for composition | Organosilicon compound S1 | 100 |  |  |  |  |
|  | Organosilicon compound S2 |  | 100 |  |  |  |
|  | Organosilicon compound S3 |  |  | 100 |  |  |
|  | Organosilicon compound S4 |  |  |  | 100 |  |
|  | Organosilicon compound S5 |  |  |  |  | 100 |
|  | Polymerization initiator PBO | 1 | 1 | 1 | 1 | 1 |
|  | PHI | 1 | 1 | 1 | 1 | 1 |
|  | PBE | 1 | 1 | 1 | 1 | 1 |
| Cured product | Inorganic fraction (%) | 44.3 | 50.3 | 58.7 | 58.3 | 35.1 |
|  | Appearance | Transparent | Transparent | Transparent | Transparent | Transparent |
|  | Heat resistance (YI value) | 8 | 6 | 4 | 2 | 48 |

As is evident from Table 2, the thermosetting composition of the present invention provides a cured product whose surface is hardly yellowed even after the use at high temperatures, and the cured product maintains good appearance for a long time.

INDUSTRIAL APPLICABILITY

The cured product obtained from the thermosetting composition of the present invention is excellent in heat resistance, and the cured product to be obtained will not cause exfoliation or cracking even exposed to heating conditions at about 100° C. to 150° C. for a long time of several hundreds to thousand hours. It is thus useful for a formation of adhesive portions, sealing portions, and protective films of electronic components in semiconductor devices, printed circuit boards, and LED-related instruments.

What is claimed is:

1. A thermosetting composition comprising:
    100 parts by mass of an organosilicon compound represented by a general formula (1); and
    0.01 to 10 parts by mass of a polymerization initiator having a 10-hour half-life temperature in a range from 80° C. to 130° C.:

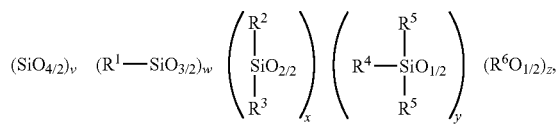

(1)

wherein in formula (1), $R^1$, $R^2$, $R^3$, $R^4$ and $R^5$ are each, independently, a hydrogen atom, or a group having an alkyl group having 1 to 10 carbon atoms, an aralkyl group having 7 to 10 carbon atoms, a cycloalkyl group having 1 to 10 carbon atoms, a cycloaralkyl group having 9 to 12 carbon atoms, an aryl group having 6 to 10 carbon atoms or an ethylenically unsaturated group; at least one of $R^1$, $R^2$, $R^3$, $R^4$ and $R^5$ is a group having an ethylenically unsaturated group; $R^6$ is a hydrogen atom or an alkyl group having 1 to 6 carbon atoms; v, w, x, y and z represent number of moles and are 0 or a positive number; at least one of w and x is a positive number; $0 \leq w/(v+x+y+z) \leq 10$ is satisfied, and a proportion of an inorganic part in the organosilicon compound is 40% or higher by mass.

2. The thermosetting composition according to claim 1, wherein said group having said ethylenically unsaturated group is represented by a general formula (2):

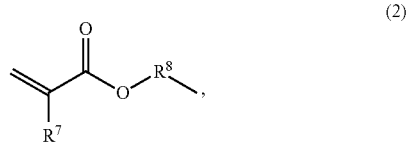

wherein in formula (2), $R^7$ is a hydrogen atom or a methyl group, and $R^8$ is an alkylene group having 1 to 6 carbon atoms.

3. The thermosetting composition according to claim 1, wherein said polymerization initiator comprises an organic peroxide.

4. The thermosetting composition according to claim 1, wherein w and x are both a positive number, and R' is a group having an ethylenically unsaturated group in said formula (1) representing said organosilicon compound.

5. A cured product obtained by heating said thermosetting composition according to claim 1.

6. The cured product of claim 5, wherein a heating temperature of the thermosetting composition is in a range from 60° C. to 200° C.

7. The thermosetting composition according to claim 1, wherein the polymerization initiator has a 10-hour half-life temperature in a range from 90° C. to 110° C.

8. The thermosetting composition according to claim 1, wherein the polymerization initiator has a 10-hour half-life temperature in a range from 95° C. to 110° C.

9. The thermosetting composition according to claim 1, wherein an amount of the polymerization initiator is in a range from 0.01 to 10 parts by mass based on 100 parts by mass of the organosilicon compound.

10. The thermosetting composition according to claim 1, wherein an amount of the polymerization initiator is in a range from 0.1 to 8 parts by mass based on 100 parts by mass of the organosilicon compound.

11. The thermosetting composition according to claim 1, wherein an amount of the polymerization initiator is in a range from 0.3 to 5 parts by mass based on 100 parts by mass of the organosilicon compound.

12. The thermosetting composition according to claim 1, wherein the proportion of the inorganic part in the organosilicon compound is 43% or higher by mass.

13. The thermosetting composition according to claim 1, wherein the proportion of the inorganic part in the organosilicon compound is 47% or higher by mass.

14. The cured product according to claim 5, wherein a reaction rate of the ethylenically unsaturated bond included the ethylenically unsaturated group is 80% or more.

15. The cured product according to claim 5, wherein a reaction rate of the ethylenically unsaturated bond included the ethylenically unsaturated group is 85% or more.

16. The cured product according to claim 5, wherein a reaction rate of the ethylenically unsaturated bond included the ethylenically unsaturated group is 90% or more.

* * * * *